Oct. 12, 1965 J. B. SCHWARZ 3,212,012

PHASE SENSITIVE CIRCUIT EMPLOYING A Y ELECTRICAL CIRCUIT INTERCONNECTED WITH A DELTA ELECTRICAL CIRCUIT

Filed Aug. 31, 1962 2 Sheets-Sheet 1

INVENTOR
JOHN B. SCHWARZ

BY Fred Fisher
ATTORNEY

Oct. 12, 1965 J. B. SCHWARZ 3,212,012
PHASE SENSITIVE CIRCUIT EMPLOYING A Y ELECTRICAL CIRCUIT
INTERCONNECTED WITH A DELTA ELECTRICAL CIRCUIT
Filed Aug. 31, 1962 2 Sheets-Sheet 2

United States Patent Office 3,212,012

Patented Oct. 12, 1965

3,212,012

PHASE SENSITIVE CIRCUIT EMPLOYING A Y ELECTRICAL CIRCUIT INTERCONNECTED WITH A DELTA ELECTRICAL CIRCUIT

John B. Schwarz, 1312 Jericho Road, Abington, Pa.

Filed Aug. 31, 1962, Ser. No. 220,747
11 Claims. (Cl. 328—133)

This invention relates to phase sensitive circuitry, and, more particularly, to circuitry for detecting the relative phase of a signal with respect to a reference source. This invention further relates to phase-to-pulse conversion circuits.

Electronic data processing systems utilize multistable state circuits extensively for storing information, counting, and the like. A bi-stable circuit, for example, may be adapted to store a binary one when it is in one of its stable states and to store a binary zero when it is in its other stable state.

Various ways are possible for representing a binary one and binary zero. One method, well-known in the prior art, is to represent a binary one as an electrical pulse and to represent a binary zero by an absence of an electrical pulse. Other methods are possible and have been devised wherein a binary one is represented as a burst of electrical energy oscillating at a certain frequency having a fixed phase relationship with a reference phase, while a binary zero is represented by a burst of energy whose phase relationship is 180° displaced from the phase of a corresponding binary one signal.

The representation of a binary one and a binary zero by the phase relationship of the corresponding signals have been employed in various devices including those circuits which are parametrically excited, such as, for example, the type of circuit known as the "parametron."

It is desired that a particular signal be recognized as either a "one" or a "zero" and, it is also desirable that such signals be converted into other binary coded electrical forms, such as the presence or absence of a pulse.

Therefore, it is an object of this invention to provide a novel phase detection circuit for detecting the phase relationship of a signal source with a reference source.

It is another object of this invention to provide a novel detection circuit for detecting binary information from an alternating current signal.

Yet another object of this invention is to provide a novel phase to pulse converter.

In accordance with one embodiment of this invention, a reference phase source, a first impedance means, and a second impedance means are coupled together to form a closed loop in a delta electrical arrangement. A signal source which has a phase relationship in phase or 180° out of phase with the reference source is coupled to a third impedance means and a fourth impedance means in a Y electrical arrangement. The delta electrical arrangement and the Y electrical arrangement are coupled together so that the reference source is coupled across the third and fourth impedance means. The first impedance means is coupled across the third impedance means and the signal source. The second impedance means is coupled across the fourth impedance means and signal source.

One of the aforementioned impedance means includes a full wave rectifier which feeds a gating circuit. Also coupled to the gating circuit is a source of clock pulses. The output of the gating circuit provides signals in pulse form depending upon the phase relationship of the signal source with the reference source.

Other objects and advantages of this invention, together with its construction and mode of operation, will be more fully apparent from the following description when read in connection with the accompanying drawings, in which.

Figure 1:
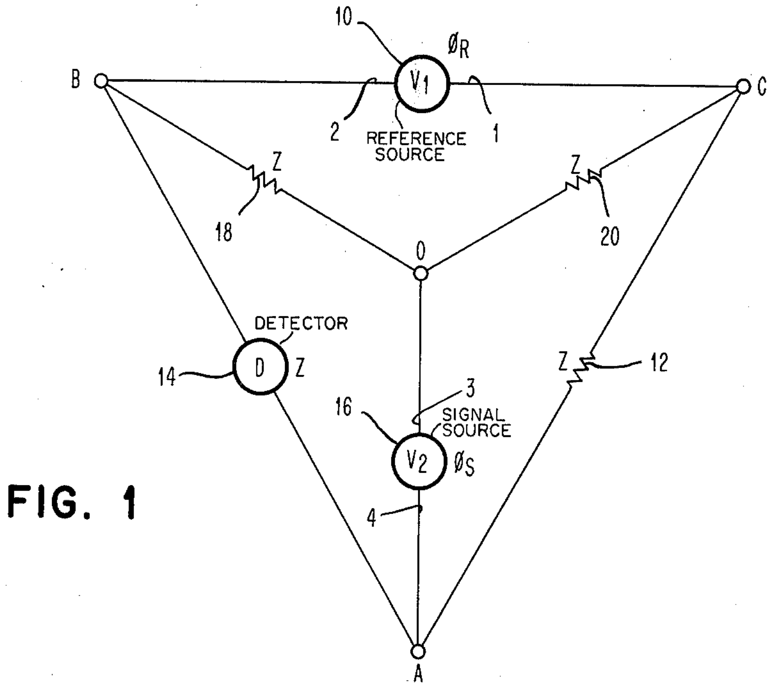
FIG. 1 is a schematic of one embodiment of this invention.

Referring to FIG. 1, there is shown one embodiment of this invention. A reference source 10 (shown as $V_1$ in FIG. 3*a*), which has a phase $\phi_R$, is coupled together with an impedance means 12 and a detector circuit 14 in a closed loop. A signal source 16 (shown as $V_2$ in FIG. 3*b*) has a phase $\phi_S$ which is either in phase or 180° out of phase with $\phi_R$. The signal source 16 is coupled to a pair of impedances 18, 20 at a common terminal O to form a Y electrical circuit. The Y electrical circuit is coupled to the closed loop at common junction points so that the impedance 12, the detector circuit 14, and the signal source 16 are coupled together at a point A. The reference source 10, the detector circuit 14, and the impedance 18 are coupled together at a point B; and the reference source 10, the impedance 12, and the impedance 20 are coupled together at a point C. The impedances 12, 18, 20 and the detector circuit 14 may collectively be considered a means for detecting whether the signal source 16 is in phase or out of phase with reference source 10.

The reference source 10 and the signal source 16, but for their connections to the remainder of the circuitry, each "float," and may be sources obtainable from the secondaries of separate transformers where the secondaries are not grounded.

Figure 2:
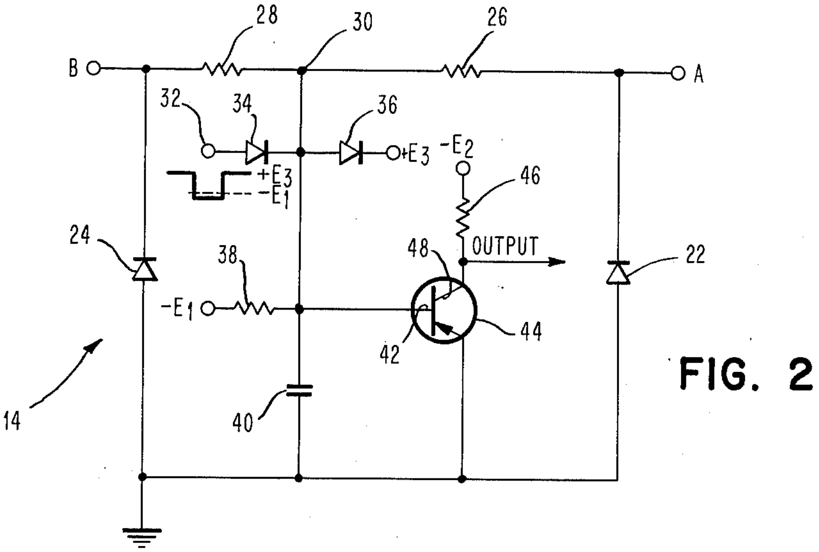
FIG. 2 is a schematic of the detection circuit shown in FIG. 1.

Referring to FIG. 2, there is shown an embodiment of a detector circuit 14. A diode 22 whose cathode is coupled to the point A has its anode coupled to a point of reference potential, such as ground. A diode 24, similarly, has its cathode coupled to the point B and has its anode coupled to the point of reference potential, such as ground. An impedance 26 and an impedance 28 couple the point A and the point B, respectively, to a common junction point 30. Clock pulses, applied to a terminal 32, are coupled to the anode of a diode 34, whose cathode is joined to the junction point 30. The anode of another diode 36 is coupled to the junction point 30; the cathode being coupled to a clamping voltage $+E_3$. A voltage source $-E_1$ is coupled through an impedance 38 to the junction point 30. Between the junction point 30 and the point of reference potential such as ground is a capacitor 40. The junction point 30 is coupled to the base 42 of a PNP transistor 44 whose emitter is coupled to ground and whose collector is coupled through a resistor 46 to a voltage source $-E_2$. Output signals are obtained from the collector 48 of the transistor 44.

In a preferred embodiment, the impedances 12, 18 and 20 are equal with each other and also equal with the equivalent impedance of the detector circuit 14.

When $\phi_R$ (at terminals 1 and 2 respectively) and $\phi_S$ (at terminals 3 and 4 respectively) are in phase with one another, the voltages at the terminals A and B are equal, tending to be held at ground, due to the diodes 22, 24 and hence, current flow through the resistors 26 and 28 due to $V_1$ and $V_2$ is nominal.

When $\phi_R$ and $\phi_S$ are in phase (waveforms 3A and 3B), and the clock pulse (waveform 3C) is "off" (during time P), current from the positive voltage $+E_3$ flows from the terminal 32, through the diode 34, the junction 30, the resistor 38, to the negative source $-E_1$. The voltage at the junction 30, and hence the base 42, is positive. The transistor 44 does not conduct; the voltage at the collector 48 stays at $-E_2$ (waveform 3D).

When the clock pulse (waveform 3C) is turned "on" (during time Q, FIG. 3), with $\phi_R$ and $\phi_S$ in phase, the voltage at the terminal 32 becomes more negative than $-E_1$, turning off the diode 34. Current flows from the ground through diodes 22 and 24, the resistors 26, 28, junction 30, and the resistor 38 to the negative source $-E_1$. The voltage at the junction point 30, being negative, turns on the transistor 44. A voltage drop across the conducting collector resistor 46 causing the potential (waveform 3D) at the collector 48 to increase toward ground.

Figure 3:
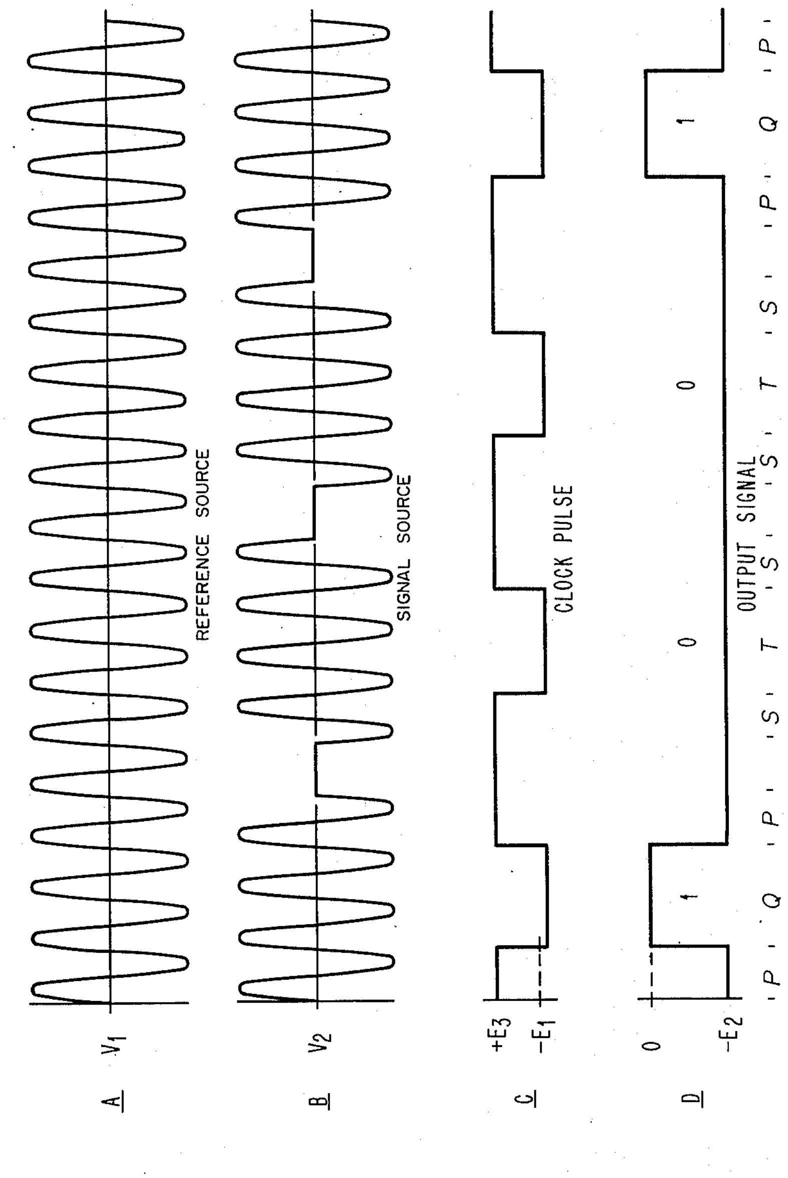
FIG. 3 is a series of waveforms which illustrates at A, a typical example of a reference source signal; at B, a typical example of a signal source; at C, typical clock pulses; and at D, typical output signals.

When $\phi_R$ and $\phi_S$ are 180° out of phase with one another, the voltages at the terminals A and B are out of phase with each other (during time periods STS, FIG. 3). Due to the diode 22, the voltage at terminal A is half-wave rectified, producing positive half cycle waves; due to the diode 24, the voltage at the terminal B is half-wave rectified, producing positive half-cycle waves. Since the signals at the terminals A and B are 180° out of phase, the resistors 26 and 28 combine these two voltages at the terminals A and B at the junction point 30, tending to provide full wave rectified signals thereat.

The voltage at the junction point 30 due to the out-of-phase levels at the terminals A and B are integrated by the capacitor 40 and resistor 38 and limited to a positive voltage $+E_3$ due to flow of current through the diode 36. This positive voltage is uneffected by action of the clock signal at the terminal 32. The base 42, being positive, keeps the transistor 44 off. The voltage at the collector 48 remains negative at $-E_2$, as shown during the time periods STS, FIG. 3.

When $\phi_R$ and $\phi_S$ are in phase, the clock pulse senses that a "1" exists. When $\phi_R$ and $\phi_S$ are out of phase, the clock pulse senses a "0."

The purpose of the clock signal at the terminal 32 is to provide accurate timing with respect to other circuitry (not shown), since accurate timing in computer circuits is highly desirable. The duration of the clock pulse exceeds the time constant of the resistor 38 and the capacitor 40. Preferably, the clock pulse is several cycles of signal in duration.

The reference source $V_1$ and the signal source $V_2$, during the clock pulse, should be of the same amplitude for optimum performance; small differences in amplitude can be tolerated.

It is apparent that minor variations can be made to this invention and other embodiments presented without departing from the spirit and scope of this invention.

For example, the detector circuit need not be part of the delta portion of the circuit but, alternatively, can be a part of the Y arrangement. Similarly, the phase sources 10 and 16 can be interchanged. The various terminals or polarities of the phase sources can be reversed with corresponding reversals occurring throughout the circuit.

Many advantages are obtained by applicant's invention. For example, the two sources $V_1$ and $V_2$ are isolated so that signal energy from either one does not flow in the other. The phase sources $V_1$ and $V_2$ are each terminated at a fixed impedance, regardless of the source impedance of the other, that is, each signal source has constant loading under all conditions. Furthermore, the various embodiments of this invention are relatively economical and simple to construct, and have fast response times.

The embodiments of the invention in which an exclusive property or privilege is claimed are defined as follows:

1. In combination,
- a delta electrical circuit having three legs coupled together at points A, B, and C,
  - the leg BC containing a first voltage source, and
  - the legs AB and AC each containing impedance means; and

- a Y electrical circuit having three legs coupled together at point O, the latter three legs being coupled to said delta circuit at points A, B, and C,
  - the leg OA containing a second voltage source, and
  - the legs OB and OC each containing impedance means; and
- one only of said impedance legs including a detector circuit.

2. The combination as claimed in claim 1 wherein said detector circuit includes rectifying means.

3. The combination as claimed in claim 1 wherein said voltage sources have substantially the same frequency and amplitude electrical characteristics.

4. The combination as claimed in claim 1 wherein one of said voltage sources has a frequency $f$, an amplitude V, and a phase 0 and the other of said sources has said frequency $f$, said amplitude V, and a phase relationship, selectively, of said phase 0 or phase $\pi$.

5. The combination as claimed in claim 1 wherein each of said impedance means contain substantially the same value of impedance.

6. In combination,
- a reference phase source having two terminals;
- a signal phase source which is either in phase with said reference source or 180° out of phase with said reference source; said signal source having two terminals; and
- means for detecting whether said signal source is in phase or out of phase with said reference source, said detecting means comprising
  - a first impedance means directly connected between one terminal of said reference source and one terminal of said signal source,
  - a second impedance means directly connected between the other terminal of said reference source and said one terminal of said signal source,
  - a third impedance means directly connected between said one terminal of said reference source and the other terminal of said signal source, and
  - a fourth impedance means directly connected between said other terminal of said reference source and said other terminal of said signal source.

7. The combination as claimed in claim 6 wherein one of said impedance means includes a detector circuit.

8. A phase to pulse converter comprising
- a reference phase source, a first impedance means, and a second impedance means coupled together in a closed loop forming a delta electrical arrangement;
- a signal phase source which operates in phase and 180° out of phase with said reference source, a third impedance means, and a fourth impedance means coupled together in a Y electrical arrangement;
- means coupling said delta arrangement to said Y arrangement, said reference source being coupled to said third and said fourth impedance means, said first impedance means being coupled to said third impedance means and said signal source, and said second impedance means being coupled to said fourth impedance and said signal source;
- one of said impedance means including a rectifier circuit, and a gating circuit coupled to said rectifier circuit; and
- clocking pulse receiving means coupled to said gating circuit.

9. The combination as claimed in claim 8 wherein said rectifier circuit includes a full-wave rectifier.

10. A first alternating current source having a fixed frequency;
- a second alternating current source having said fixed frequency either in phase or 180° out of phase with said first source, said second source being coupled to said first source;

a first diode coupled to said first source, said diode having a pole coupled to a reference direct current potential, whereby said first diode operates to half-wave rectify the current from said first source;

a second diode coupled to said second source having a like pole coupled to said reference potential, whereby said second diode operates to halfwave rectify the current from said second source;

a first impedance coupled to said first diode;

a second impedance coupled to said second diode;

means joining said first impedance to said second impedance whereby, when said second source is in one but not the other of said phases, substantially full-wave rectified signals are provided at said joining means; and a detector circuit coupled to said joining means for detecting whether said signal source is in phase or out of phase with said reference source.

11. A phase to pulse converter comprising:

a reference phase source, a first impedance means, and a second impedance means coupled together in a closed loop forming a delta electrical arrangement;

a signal phase source which operates in phase and 180° out of phase with said reference source, a third impedance means, and a fourth impedance means coupled together in a Y electrical arrangement;

means coupling said delta arrangement to said Y arrangement, said reference source being coupled to said third and said fourth impedance means, said first impedance means being coupled to said third impedance means and said signal source, and said second impedance means being coupled to said fourth impedance means and said signal source;

one of said impedance means including a first diode coupled to one of said sources, said diode having a pole coupled to a reference direct current potential whereby said first diode operates to halfwave rectify the current from said one of said sources, a second diode coupled to the second one of said sources having a like pole coupled to said reference potential whereby said second diode operates to halfwave rectify the current from said second one of said sources, a first impedance coupled to said first diode, a second impedance coupled to said second diode, a means joining said first impedance to said second impedance whereby when said second source is in one but not the other of said phases substantially fullwave rectified signals are provided at said joining means, a detector circuit coupled to said joining means, and a gating circuit coupled to said detector circuit; and clocking pulse receiving means coupled to said gating circuit.

References Cited by the Examiner

UNITED STATES PATENTS

| | | | |
|---|---|---|---|
| 2,923,884 | 2/60 | Moss | 324—83 |
| 3,065,427 | 11/63 | Birdwell | 307—88.5 |

ARTHUR GAUSS, *Primary Examiner.*